United States Patent [19]

Kotani et al.

[11] 4,318,597

[45] Mar. 9, 1982

[54] OPTICAL PRINT HEAD FOR OPTICAL PRINTING DEVICES

[75] Inventors: Shintaro Kotani; Ichimatsu Abiko, both of Tokyo; Rikuo Takano, Zushi; Yasushi Hoshino, Yokosuka; Yukio Tokunaga, Yokosuka; Kazuyoshi Tateishi, Yokosuka, all of Japan

[73] Assignee: Oki Electric Industry Co., Ltd., Tokyo, Japan

[21] Appl. No.: 178,528

[22] Filed: Aug. 15, 1980

[30] Foreign Application Priority Data

Aug. 21, 1979 [JP] Japan ................... 54-105485

[51] Int. Cl.³ ............... B41B 13/00; G03B 27/00
[52] U.S. Cl. ............................... 354/5; 355/1
[58] Field of Search ............ 354/5, 17, 12, 13, 14; 355/1

[56] References Cited

U.S. PATENT DOCUMENTS 3,512,861 5/1970 Schackert ................ 355/1 X
3,611,891 10/1971 McNaney ................ 354/17
3,850,517 11/1974 Stephany et al. ........... 354/12
4,089,008 5/1978 Suga et al. ................ 354/5
4,107,687 8/1978 Pfeifer et al. ............. 354/5 X

OTHER PUBLICATIONS

I.B.M. Technical Disclosure Bulletin vol. 13 No. 12 May 1971 pp. 3757 & 3758.

*Primary Examiner*—Donald A. Griffin
*Attorney, Agent, or Firm*—Berger & Palmer

[57] ABSTRACT

An optical printing device includes a photosensitive means having a photosensitive surface and an optical print head. The optical print head has a plurality of arrays of a plurality of light emitting devices selectively energized and an optical means to form light images from the light emitting devices on the photosensitive surface.

A plurality of the light emitting device arrays are arranged in a plurality of rows, with the light emitting devices aligned in a common direction with the arrays.

The optical means comprises a plurality of graded index optical fiber arrays of which the optical axes are directed perpendicularly to the aforesaid photosensitive surface.

7 Claims, 9 Drawing Figures

ROTATION DIRECTION
OF DRUM

OPTICAL PRINT HEAD FOR OPTICAL PRINTING DEVICES

BACKGROUND OF THE INVENTION

This invention relates to a print head for optical printing devices.

High speed printing devices used in data processing systems are intended for translating electric input signals into a visual representation readily recognizable in a printed form.

Of such printing devices, this invention is applicable to an optical printing device using light sources and photosensitive means, more particularly to an optical printing device using solid state light emitting devices.

For the light emitting devices, linear arrays of light emitting diodes or semiconductor lasers are employed.

An array of light emitting devices may, for example, consist of gallium arsenide phosphide as a base material having N layers of GaAsP formed by means of an epitaxial growth process, and a large number of P layers in a linear configuration formed by diffusion of Zn. However, the maximum available size of gallium arsenide phosphide as the base material is limited approximately to five centimeters in terms of its wafer diameter.

For the purpose of extending the printing width of a printer, a plurality of light emitting device arrays are employed and it is necessary to align light images from said light emitting devices in a single straight image line on the photosensitive surface. Hitherto, for optical printing devices, a light emitted from each individual light emitting device in an array is coupled to the photosensitive surface by means of each individual optical fiber cable arranged opposite to the corresponding light emitting device.

Said light emitting device and one end of said opposite optical fiber cable either come into contact with each other or are closely disposed having a minor spacing which may not exceed the order of several microns. The other end of the optical fiber cable and the photosensitive surface are similarly disposed leaving a spacing which may amount approximately to one hundred microns.

In this case, said respective spacings are extremely delicate as exemplified and therefore must precisely be maintained since the space intervals in excess of the foregoing values will adversely affect the light transmission properties and the extent of light spots, namely the printing quality. It is, however, extremely difficult to keep precisely said space intervals. Moreover, if a fiber cable collides with the photosensitive surface, with the spacing between the fiber cable and the photosensitive surface on the drum failing to be provided correctly, the fiber cable and the photosensitive surface may be damaged due to the rotation movement of the drum.

In the case of a fiber cable, its image plane is located at the tip cross-section thereof, whereby the focal depth can be available only inside the cable.

SUMMARY OF THE INVENTION

An object of the present invention is to provide a novel print head for high speed optical printing devices.

Another object of the present invention is the provision of a print head capable of achieving high quality print out.

A further object of the present invention is to provide an easy adjustment of the positional relations between each other of the constitutent units of a print head.

A print head according to this invention includes a plurality of arrays having a plurality of light emitting devices to be energized selectively, and an optical means for forming light images from said light emitting devices on a photosensitive surface.

A plurality of light emitting device arrays are arranged in a plurality of rows with the light emitting devices being aligned in a single row in a common direction with said arrays. The optical means consists of a plurality of graded index optical fiber arrays of which the optical axes are oriented perpendicularly to the aforesaid photosensitive surface.

For a better understanding of this invention, reference is made to the following detailed description of the invention given in connection with the accompanying drawings. In the drawings:

DETAILED DESCRIPTION OF PREFERRED EMBODIMENTS

Figure 1:
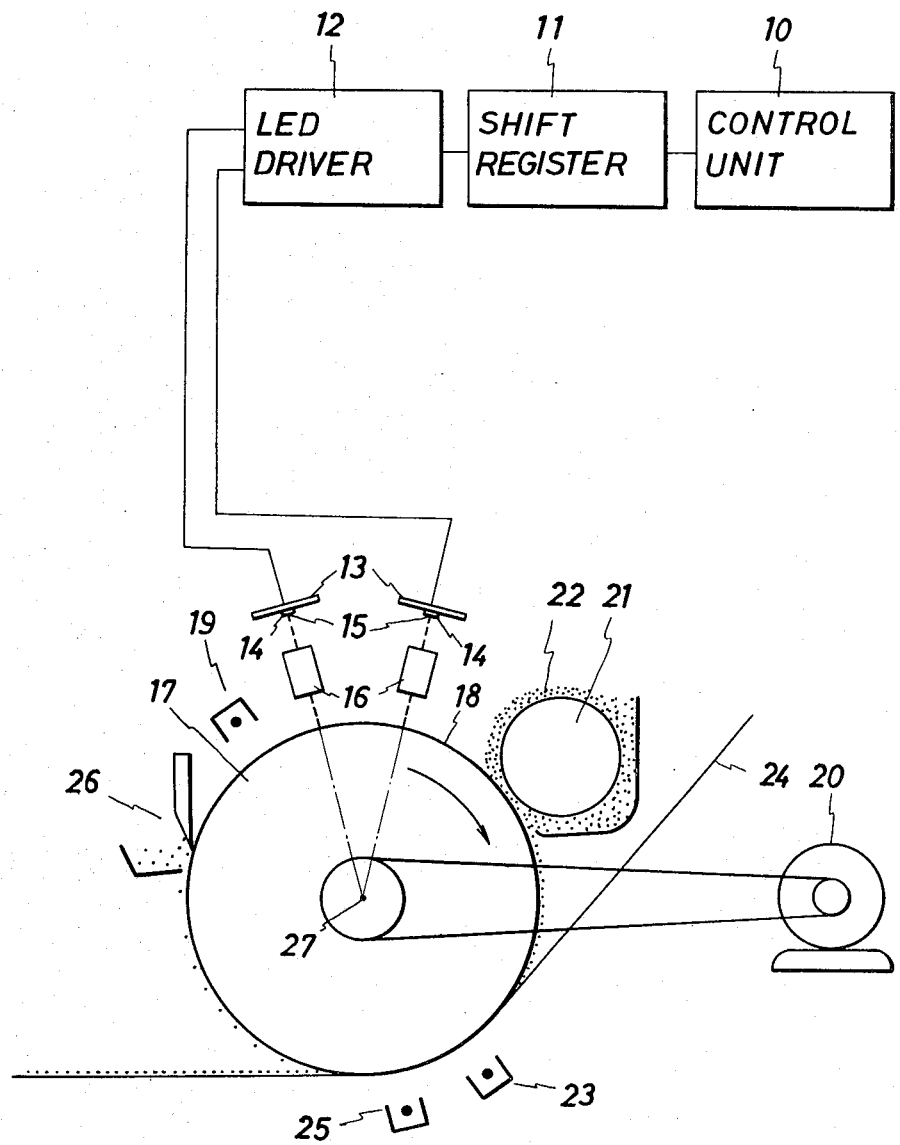
FIG. 1 is a schematic view of an optical printing system according to the invention.

Referring now to FIG. 1, there is shown an optical printing system according to the invention. The system comprises an optical printer which provides a dot pattern representation for characters by means of, for example, a zerographic system using a photosensitive surface. A plurality of electrical input signals representing character information are sent from an input/output control unit 10 to a shift register 11. The shift register 11 temporarily stores the character information and upon framing the information for a complete printing line, transfers the information for the complete dot line to a driving circuit 12 of light emitting devices.

The light emitting device driver 12 is energized by said information and the light emitting device arrays 14 mounted on ceramic headers 13 become illuminated. The light emitting device arrays 14 are provided with a large number of light emitting devices 15 or light emitting diodes aligned in a linear array. Said light emitting devices 15 are energized selectively by the light emitting device driver 12. Light emitted from the light emitting device arrays 14 is projected as light images on a photosensitive surface 18 of a photosensitive drum 17 through the graded index optical fiber arrays 16.

The optical axes of both graded index optical fiber arrays 16 are placed perpendicularly to the photosensitive surface 18 or along the rotation axis 27 of the photosensitive drum 17. Therefore, light images are formed in two rows on the photosensitive surface 18. However, dots for one line can be imaged as light images in a single linear row on the photosensitive surface 18, if the lighting time of the light emitting device arrays 14 is correspondingly postponed.

When projection of a chain of dots representing a first full line is completed, then a second line is formed by means of dot information. With this sequence being repeated, printout of the character information for each individual line is accomplished. In this manner, the character information for the succeeding lines are printed out on a line-by-line basis.

The method for printout by implementing light images formed on a photosensitive drum 17 is well known to those skilled in the art.

In brief, a charger 19 places a corona charge on the photosensitive drum 17. If the photosensitive surface 18 is exposed to light emitted from the light emitting device arrays 14, electrostatic latent images are formed in the areas so exposed. With the photosensitive drum 17 being driven at a constant rotation rate by means of a motor 20, a black toner 22 of magnetic material is applied to develop the electrostatic latent images when said areas arrive at the proximity of a developer 21.

Then transfer stage 23 attracts electrostatically the toner material from the photosensitive surface 18 and transfers the toner images onto a sheet of paper 24. Separation stage 25 is provided for separating a printout paper sheet from the photosensitive surface 17. Any residual toner material on the photosensitive surface 18 can be removed by means of a cleaning stage 26.

While in the optical printer disclosed above, a photosensitive drum having a photosensitive surface is employed as a photosensitive means, it may be replaced with a photosensitive copy paper sheet or a photosensitive surface of a design to be fed by means of a belt conveyer.

In short, any means having a photosensitive surface capable of forming light images may be implemented.

Figure 2:
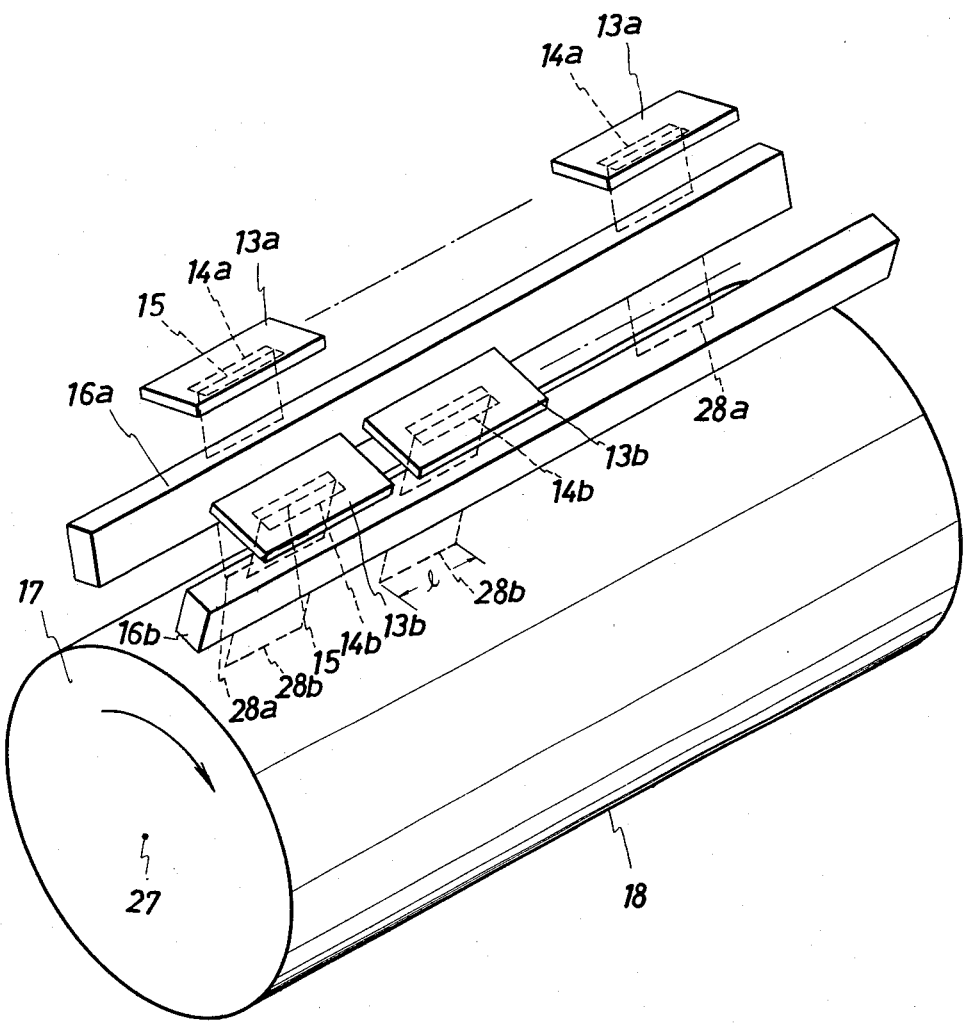
FIG. 2 shows an embodiment of the invention wherein, among others, arrangements of the light emitting device arrays and the graded index optical fiber arrays are illustrated. Light images from the light emitting devices are also illustrated.

FIG. 2 shows an embodiment of this invention. Light emitting device arrays 14a and 14b each comprising a large number of light emitting devices 15 arranged in a single straight line are mounted on ceramic headers 13a and 13b and are disposed in a plurality of rows, for example, in two rows along a longitudinal axis of the photosensitive drum 17. Headers 13a and 13b are positioned with the predetermined space intervals in their respective rows parallel to the photosensitive surface 18. Therefore, the light emitting device arrays 14a and 14b are disposed in a staggered configuration alternately in two intermittent rows in the same direction as the rows of the light emitting devices 15. Light emitting device arrays 14a in row a and the light emitting device arrays 14b in row b are laterally spaced from each other by the predetermined space intervals and the light emitting devices 15 in the light emitting device arrays in each row are arranged in a straight line, while the two rows of the light emitting devices are disposed in parallel with respect to each other.

A graded index optical fiber array 16a is disposed between the light emitting device arrays 14a in row a and the photosensitive surface 18, while an optical fiber array 16b is disposed between the light emitting device arrays 14b in row b and the photosensitive surface 18. The optical axes of the optical fiber arrays 16a and 16b are directed perpendicularly to the photosensitive surface 18. Each of the optical fiber arrays 16a and 16b is of an equimultiple lens power. Light emitted from each light emitting device array 14a is projected as light images 28a by means of the graded index optical fiber array 16a on the photosensitive surface 18. Light outputs derived from each of the light emitting device arrays 14b are also imaged as light images 28b on the photosensitive surface 18 in the same manner by means of the graded index optical fiber array 16b. Light images 28a or 28b has the same lateral length as l representing the length measured in the row direction of the light emitting devices 15 and are formed at a pitch rate twice the length in a single straight line for each row transversely to the rotation direction of the photosensitive drum 17.

Therefore, the light images 28a and 28b are formed alternately in a staggered intermittent formation in two separate rows on the photosensitive surface 18.

Figure 3:
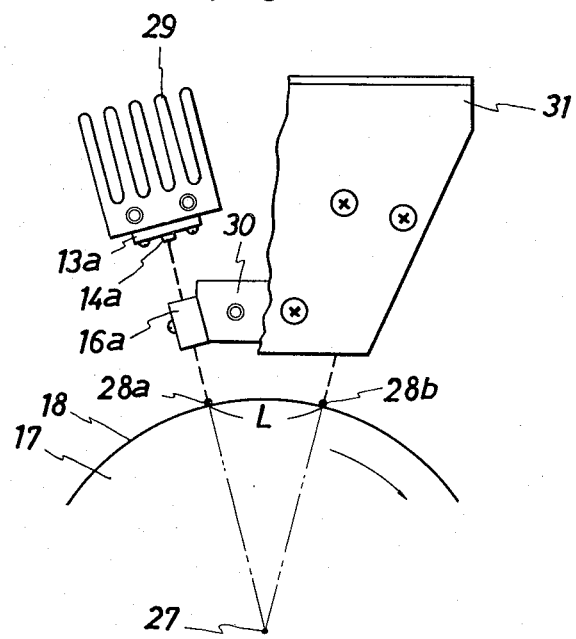
FIG. 3 is a side view of arrangements of the light emitting device arrays and the graded index optical fiber arrays.

FIG. 3 shows the positional relationship with each other of the light emitting device arrays, graded index optical fiber arrays and photosensitive drum. This figure is a view taken from the side in FIG. 2.

Figure 4:
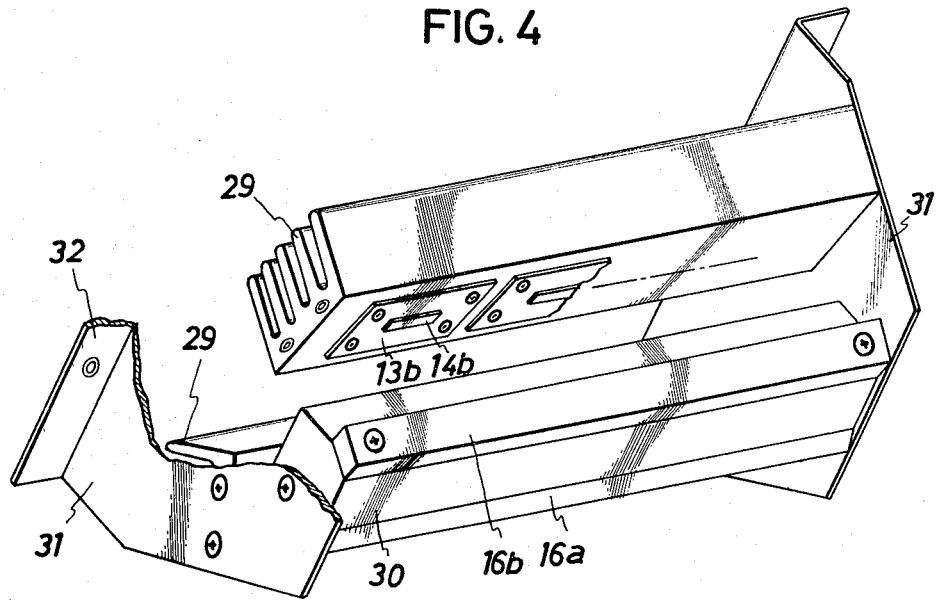
FIG. 4 illustrates a manner to mount the light emitting device arrays and the graded index optical fiber arrays.

FIG. 4 illustrates a manner of assembling the light emitting device arrays and graded index optical fiber arrays.

Turning now to FIG. 3, the light emitting device array 14a is mounted on the ceramic header 13a which is further mounted on a heat sink 29 by means of screws. More particularly, a ceramic header 13b is mounted on the bottom surface of the heat sink 29 as illustrated as 13b in FIG. 4.

Graded index optical fiber arrays 16a and 16b are secured respectively to each of both sides of a spacer 30 by means of screws. The heat sink 29 and the spacer 30 are secured to holders 31 by means of screws at both of their extremities. Both holders 31 are assembled into the printer main frame by means of screws at their mounting flanges 32. Referring again to FIG. 3, the optical axis of the graded index optical fiber array 16a is directed perpendicularly to the photosensitive surface 18, or along the rotation axis 27 of the photosensitive drum 17. Therefore, light from the light emitting device arrays 14a is projected perpendicularly to the photosensitive surface 18 through the graded index optical fiber array 16a. The description which has been indicated for row a is also applicable to row b by substitution of 14b and 16b for 14a and 16a, respectively.

Light images 28a and 28b are formed in the full amount of definition on the photosensitive surface 18.

In optical printers of a design adapted for use with light emitted not perpendicularly to the photosensitive surface 18, light images are formed in inferior quality and in dispersed patterns in case the circularity of the photosensitive drum 17 is irregular with respect to the rotation axis 27 thereof.

As will be treated elsewhere in later pages, the distance between the light images 28a and 28b is measured to be L on the photosensitive surface 18.

As shown in FIG. 3, the space between light emitting device array 14a and graded index optical fiber array 16a is the same amount as that between said fiber array 16a and the photosensitive surface 18. Said space may range from a few millimeters up to the order of ten millimeters, thereby making it possible to adjust the positions of each constituent unit with considerable ease since said space is substantially greater than what is required in conventional techniques.

Figure 5:
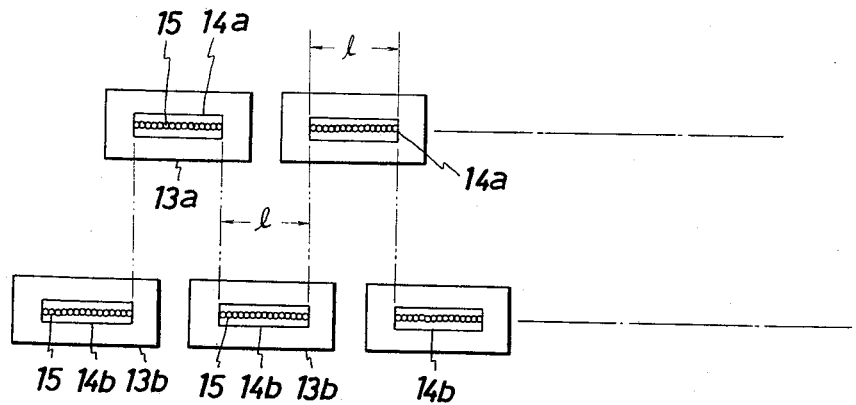
FIG. 5 is an illustration of the light emitting device arrays and an arrangement thereof viewed from the photosensitive surface.

FIG. 5 is a view of light emitting device arrays with each of the light emitting device arrays 14a and 14b being mounted respectively on the ceramic header 13a 13b. Each of the light emitting device arrays 14a and 14b includes a large number of light emitting devices 15 which are disposed in a queue and are energized selectively. By way of example, a light emitting device array contains 128 light emitting devices disposed laterally and interspaced between each other at 0.1 millimeter intervals, if a resolution of 10 lines per millimeter is required. Light emitting device arrays 14a in row a and 14b in row b are disposed alternately in two rows in a staggered configuration. Each of the light emitting devices 15 has a dimension of 1 in the row direction and the interspacing between each other of the light emitting devices is measured also at 1.

Similarly, light arrays of light emitting devices on each row, namely a total of sixteen arrays are necessary to provide an optical print head. In this case, the total number of the light emitting devices amounts to 2048, a multiple of 128 by 16.

Figure 6:
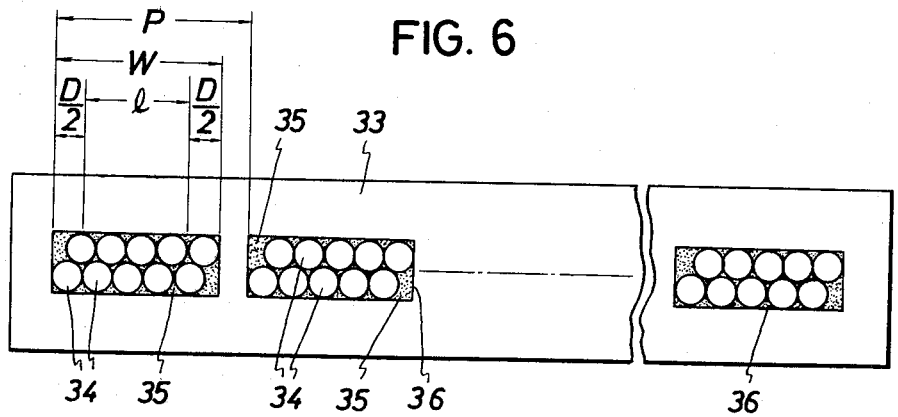
FIG. 6 and FIG. 7 show arrangements of the graded index optical fiber arrays viewed from the optical axes.

FIG. 6 shows a graded index optical fiber array viewed along their optical axis.

Graded index optical fiber arrays include a certain number of segments of graded index optical fiber lenses 34 disposed in two rows, which segments are spaced with each other with a predetermined pitch on a support 33, are embedded thereinto and are packaged by means of a resin material 35 filling the intersticies of said lenses. A glass-reinfored epoxy resin material may, by way of example, be used as the support 33 and epoxy resin as said resin material 35.

Graded index optical fiber arrays are made up of a plurality of individual lenses 34 formed by cutting an optical fiber bundle crosswise in a predetermined dimension so as to obtain an image formation function and images of an equimultiple lens power. Said optical fiber lenses 34 have a diameter of approximately 1 millimeter. In the graded index optical fiber arrays, an image formation for one spot is accomplished by means of a certain number of optical fiber lenses 34. The diameter of a bundle of optical fiber lenses contributing to the image formation is assumed to be D.

Graded index optical fiber arrays as illustrated in FIG. 6 include optical fiber lenses grouped on a segment basis so as to render each of said segments 34 to be placed opposite to a corresponding one of the light emitting device arrays. The width of a single optical fiber lens segment 36 is determined to warrant that W = l + D, wherein l, as described before, represents the lateral dimension of each individual light emitting device 15 of the light emitting device arrays 14a and 14b and corresponds to the image length on the photosensitive surface 18 as illustrated in FIG. 2. Optical fiber lens segments 36 are defined in the manner that P = 2l, wherein P represents the pitch and each of the segments are disposed so as to be coupled to a corresponding one of the light emitting device arrays 14a or 14b.

Figure 7:
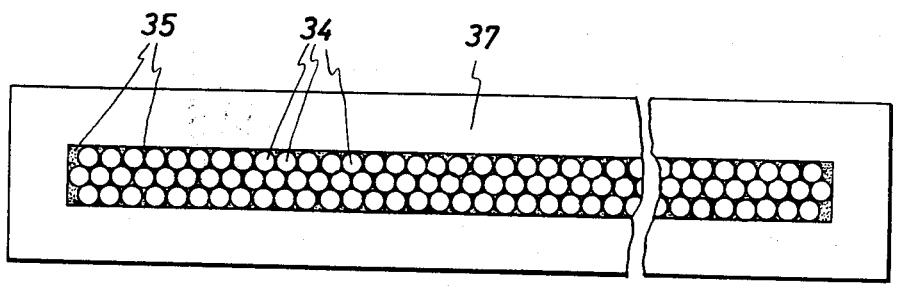

FIG. 7 shows a graded index optical fiber array in which a large number of graded index fiber lenses 34 disposed in three rows are embedded into a support 37 to form a single array and are packaged by means of a resin material 35. Graded index optical fiber lenses 34 are disposed so that they are coupled to the complete elements of a plurality of light emitting device arrays. In this case, they can be more readily assembled because of the absence of a segment construction which entails physical restrictions in size inherent to the graded index optical fiber arrays as illustrated in FIG. 6.

Figure 8:
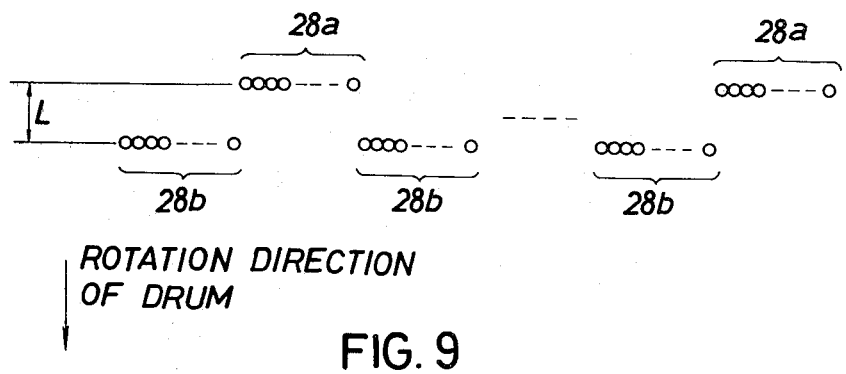
FIG. 8 illustrates light images emitted from light emitting devices as formed on the photosensitive surface.

FIG. 8 shows light images from light emitting devices as formed on a photosensitive surface. As illustrated also in FIG. 3, the light images 28a and 28b from the light emitting devices are projected intermittently leaving distance L between each section of the light images 28a and 28b. Therefore, the light emitting device arrays 14a in a row a as appears in FIG. 2 must be energized in the first place and after lapse of a predetermined amount of time, the light emitting device arrays 14b in row b must be on. The time intervals can be adjusted electrically by means of clock pulses given by L/V, assuming the displacement of the photosensitive surface 18 as V.

Figure 9:
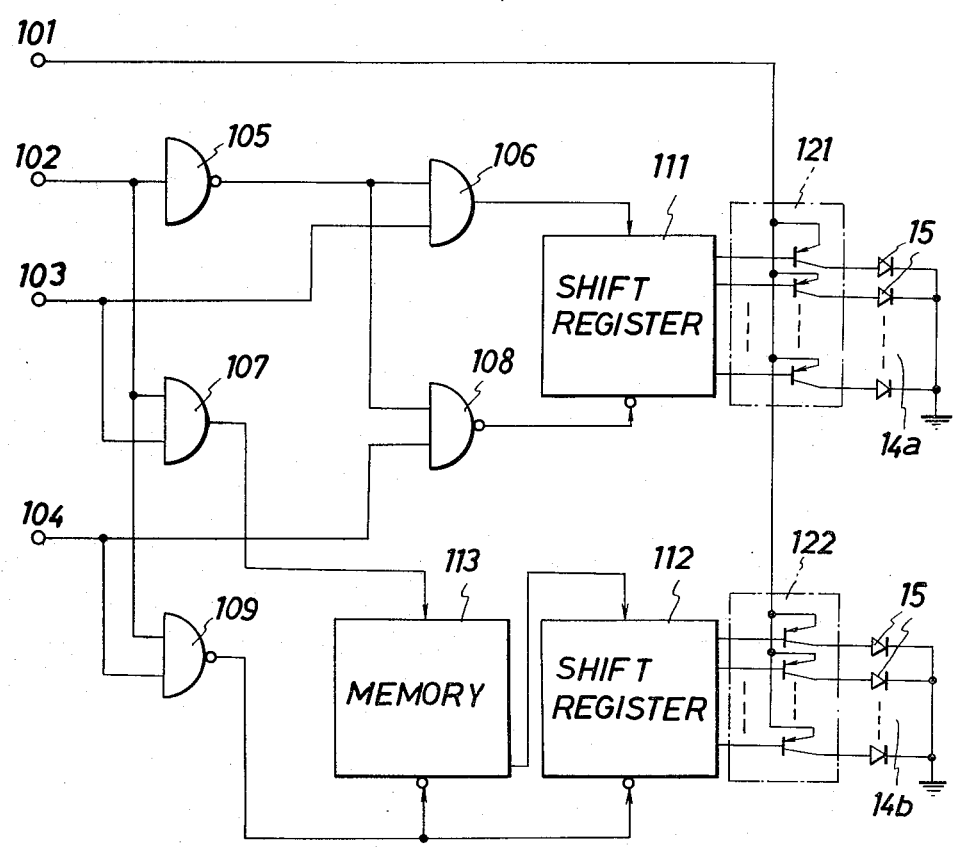
FIG. 9 shows a driving system for light emitting devices.

FIG. 9 shows a driving system for light emitting devices. The driving system comprises input terminals 101 through 104, gate circuits 105 through 109, shift registers 111, 112, a memory driver 113, light emitting device drivers 121, 122 and light emitting device arrays 14a, 14b. Printing information in electrical signal form is applied in series from an input terminal 103. Each of the light emitting device arrays is assumed to comprise K bits or to have K element of light emitting devices 15. To the input terminal 102, signals are applied to distribute bits of the aforesaid printing information in every K bits. The distribution function is performed by means of the gates 105, 106 and 107. Signals entering the light emitting device arrays 14a in a row a are delivered from the gate 106 to the shift register 111 of a serial-in and parallel-out mode and further to transistors of the light-emitting device driver 121. On the other hand, signals entering the light emitting device arrays 14b in row b are accumulated temporarily in the memory 113 from the gate 107.

Light emitting device arrays 14b in row b place light images representing information in a particular line by an amount of delay equal to L/V as illustrated above later than the light emitting device arrays 14a in row a, whereby said memory 113 is of a serial-in and parallel-out type and is intended for accumulating information for said time intervals. This can be constituted either with a shift register or a random access memory. Memory capacity of said memory 113 must be Kn LR bits at least, wherein, as stated in the foregoing, K represents the number of light emitting devices covered by one unit of the light emitting device arrays, n is the number of the light emitting device arrays 14b in row b, L stands for the distance between the light images 28a and 28b, and R for the aforesaid resolution of a printer.

Information accumulated in the memory 113 is now applied to the shift register 112 of a sequencial serial-in and parallel-out fashion and further to the transistors of the light emitting device driver 122 from the shift register 112.

When light emitting potential is applied to transistors of the light emitting device drivers 121 and 122 through the input terminal 101, said transistors become their on-state, thereby causing the light emitting devices 15 of the light emitting device arrays 14a and 14b to be lighted selectively according to the printing information. Clock pulses are applied to the input terminal 104, and through the gates 108 and 109, to the shift register 111 and 112 as well as to the memory 113.

As evidenced in the foregoing description, the present invention provides the following advantages.

According to this invention, light emitting device arrays are used as light sources and graded index optical fiber arrays are employed as part of the optical system, which makes it feasible to provide a small size, high speed, high printing quality optical printer.

According further to this invention, between light emitting device arrays and graded index optical fiber arrays, as well as between said fiber arrays and the photosensitive surface, there can be left respectively appropriate space of several millimeters large enough to assure that the space intervals are readily determined and adjusted therebetween. In addition, the absence of physical contact between the units involved can prevent them from being damaged due to collisions with each other.

In a xerographic reproduction system, a toner material is disparsed at the moment light emitting device arrays are energized but the dispersion extent of its particles is not enough.

As described in the foregoing, this invention makes it practical to leave adequate space intervals between the constituent units. Thus, the light transmission loss due to the adherence of a toner material to graded index optical fiber arrays can be of little importance because of a proper amount of space provided between the related units.

According to the invention, the plane of image formation of a graded index optical fiber array is located in the space including the photosensitive surface. Therefore, the focal depth can be taken on both sides of said image plane.

A graded index optical fiber array applicable in use to the invention is readily available due to its simple construction in which a plurality of optical fiber lenses are laterally disposed and are embedded into a support.

This invention makes it feasible to place the optical axes of light emitting device arrays perpendicularly to a photosensitive surface. Therefore slight changes in the space intervals between graded index optical fiber arrays and a photosensitive surface will not adversely affect the pattern definition for printing.

It should be emphasized that the foregoing description as merely illustrative for a better understanding of the invention and not as restrictive thereof. And it goes without saying that the invention may be modified without departing from the scope and spirit of the invention.

What is claimed is:

1. An optical print head for optical printing devices comprising light emitting device arrays having a plurality of light emitting devices selectively energized and arranged in a row, said light emitting device arrays being arranged in a plurality of rows with said light emitting devices aligned in a common direction with said light emitting device arrays, and a plurality of graded index optical fiber arrays causing light images from said light emitting devices to be formed on a photosensitive surface of a photosensitive means, said graded index optical fiber arrays having optical axes directed perpendicularly to said photosensitive surface and being arranged opposite to each row of said light emitting device arrays and having an equimultiple lens power, said photosensitive surface rotatable on a drum having an axis of rotation, said optical axis of said optical fiber arrays being perpendicular to said axis of rotation.

2. An optical print head of claim 1 in which said light emitting device arrays are light emitting solid state diode arrays.

3. An optical print head of claim 1 in which said light emitting device arrays are solid state laser arrays.

4. An optical print head of claim 1 in which said light emitting device arrays are arranged alternately in two staggered rows, the light emitting devices in each of said light emitting device arrays in each of said rows being arranged side by side and being spaced uniformly between each other by a distance corresponding to the lateral dimension of said individual element thereof.

5. A driving system for optical print heads as set forth in claim 4 including a memory for storing input information delivered to the light emitting devices in a second row for the time lag in which the light emitting devices in a first row are lightened simultaneously with those in said second row.

6. An optical print head of claim 1 in which said graded index optical fiber arrays comprise a plurality of optical fiber lenses grouped into a plurality of segments arranged on a support, whereby each of said graded index optical fiber arrays is positioned opposite to a corresponding one of said eight emitting device arrays.

7. An optical print head of claim 1 in which said graded index optical fiber arrays comprise a plurality of optical fiber lenses arranged on a single continuous support, whereby said graded index optical fiber arrays are positioned opposite to the whole of said plurality of light emitting device arrays.

* * * * *

UNITED STATES PATENT AND TRADEMARK OFFICE
CERTIFICATE OF CORRECTION

PATENT NO. : 4,318,597
DATED : March 9, 1982
INVENTOR(S) : Shintaro Kotani et al.

It is certified that error appears in the above-identified patent and that said Letters Patent are hereby corrected as shown below:

Title page - under the heading "Assignee": "Oki Electric Industry Co., Ltd."

should read --Oki Electric Industry Co., Ltd. and Nippon Telegraph and Telephone Public Corporation,--.

Signed and Sealed this

Seventeenth Day of August 1982

[SEAL]

Attest:

GERALD J. MOSSINGHOFF

Attesting Officer     Commissioner of Patents and Trademarks